United States Patent
Fujii et al.

(10) Patent No.: US 11,189,285 B2
(45) Date of Patent: Nov. 30, 2021

(54) AIR PURIFIER

(71) Applicant: SHARP KABUSHIKI KAISHA, Sakai (JP)

(72) Inventors: Takahide Fujii, Sakai (JP); Shintaro Nomura, Sakai (JP); Daisuke Moriuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 160 days.

(21) Appl. No.: 16/640,528

(22) PCT Filed: Jan. 10, 2018

(86) PCT No.: PCT/JP2018/000291
§ 371 (c)(1),
(2) Date: Feb. 20, 2020

(87) PCT Pub. No.: WO2019/058572
PCT Pub. Date: Mar. 28, 2019

(65) Prior Publication Data
US 2020/0357396 A1    Nov. 12, 2020

(30) Foreign Application Priority Data

Sep. 20, 2017   (JP) .............................. JP2017-180591

(51) Int. Cl.
*G10L 15/22*    (2006.01)
*F24F 11/88*    (2018.01)
*F24F 110/50*   (2018.01)
*F24F 120/20*   (2018.01)

(52) U.S. Cl.
CPC .............. *G10L 15/22* (2013.01); *F24F 11/88* (2018.01); *F24F 2110/50* (2018.01); *F24F 2120/20* (2018.01); *G10L 2015/223* (2013.01); *G10L 2015/227* (2013.01)

(58) Field of Classification Search
USPC ...................................... 704/1–504
See application file for complete search history.

(56) References Cited

U.S. PATENT DOCUMENTS

| | | | |
|---|---|---|---|
| 8,907,803 B2 * | 12/2014 | Martin | G01N 33/0075 340/632 |
| 9,890,969 B2 * | 2/2018 | Martin | G01N 33/00 |
| 10,224,060 B2 * | 3/2019 | Shinkai | A61B 5/165 |
| 10,281,167 B2 * | 5/2019 | Martin | F24F 11/30 |
| 10,599,116 B2 * | 3/2020 | Pillai | A61B 5/02055 |

(Continued)

FOREIGN PATENT DOCUMENTS

| | | |
|---|---|---|
| CN | 101031760 A | 9/2007 |
| JP | 2017-083165 A | 5/2017 |
| JP | 2017-150692 A | 8/2017 |

*Primary Examiner* — Marcus T Riley
(74) *Attorney, Agent, or Firm* — ScienBiziP, P.C.

(57) ABSTRACT

An uttered utterance text that is a high priority text to be reported to a user is uttered reliably. The air purifier (10) includes an utterance text extraction unit (11a) that extracts an utterance text associated with an apparatus state and an utterance control unit (11b) that causes the utterance text extracted by the utterance text extraction unit (11a) to be uttered in descending order of priorities assigned to categories including the utterance text according to one of the priorities that is assigned to one of the categories that includes the utterance text.

7 Claims, 10 Drawing Sheets

(56) References Cited

U.S. PATENT DOCUMENTS

| | | | |
|---|---|---|---|
| 10,712,722 B2* | 7/2020 | Pillai | G16H 10/60 |
| 10,887,124 B2* | 1/2021 | Jung | G10L 15/30 |
| 10,890,350 B2* | 1/2021 | Martin | F24F 11/30 |
| 2009/0204262 A1* | 8/2009 | Nishimura | F24F 11/62 |
| | | | 700/276 |
| 2013/0174646 A1* | 7/2013 | Martin | G01N 33/00 |
| | | | 73/31.02 |
| 2015/0052975 A1* | 2/2015 | Martin | F24F 11/30 |
| | | | 73/31.02 |
| 2016/0372138 A1* | 12/2016 | Shinkai | G10L 15/22 |
| 2017/0135407 A1* | 5/2017 | Cameron | G10L 17/00 |
| 2018/0149383 A1* | 5/2018 | Martin | G01N 33/0075 |
| 2019/0081810 A1* | 3/2019 | Jung | G10L 15/30 |
| 2019/0257543 A1* | 8/2019 | Martin | F24F 11/62 |
| 2020/0051554 A1* | 2/2020 | Kim | G06F 3/167 |
| 2020/0192684 A1* | 6/2020 | Woo | G06F 3/167 |
| 2020/0357396 A1* | 11/2020 | Fujii | F24F 11/526 |
| 2020/0365150 A1* | 11/2020 | Jeon | D06F 34/04 |
| 2021/0075634 A1* | 3/2021 | Jung | G06F 3/167 |
| 2021/0131692 A1* | 5/2021 | Martin | F24F 11/30 |

* cited by examiner

| UTTERANCE TRIGGER | | UTTERANCE CATEGORY (UTTERANCE TEXT) | PRIORITY |
|---|---|---|---|
| AUTOMATIC UTTERANCE [BODY] | SENSING OR THE LIKE | AIR IMPURITY | 4 |
| | REFILLING OR THE LIKE | NOTICE | 3 |
| | "DARK" SENSED BY LIGHT INTENSITY SENSOR | SLEEP | 2 |
| | DETECTION BY WATCH OR THE LIKE | WATCH | 5 |
| | ERROR DETECTION OR THE LIKE | GUIDANCE | 6 |
| | START/END OF AUTOMATIC PRE-FILTER CLEANING | AUTOMATIC PRE-FILTER CLEANING | 1 |

AIR IMPURITY

| JINGLE | UTTERANCE TEXT | UTTERANCE CONDITION (1) (TRIGGER) | UTTERANCE CONDITION (2) | PRIORITY |
|---|---|---|---|---|
| ORDINARY | FOUND AIR IMPURITY. WILL CLEAN AIR IMMEDIATELY. | CLEAN MONITOR CHANGES TO RED. | • ODOR MONITOR ILLUMINATES ORANGE, AND PM2.5 MONITOR LAMP IS OFF.<br>• 3 HOURS HAVE ELAPSED SINCE PREVIOUS UTTERANCE FROM "CLEAN MONITOR". | 1 |
| ORDINARY | FOUND AIR IMPURITY. WILL CLEAN AIR. | CLEAN MONITOR CHANGES TO YELLOW. | • ODOR MONITOR ILLUMINATES ORANGE, AND PM2.5 MONITOR LAMP IS OFF.<br>• 3 HOURS HAVE ELAPSED SINCE PREVIOUS UTTERANCE FROM "CLEAN MONITOR". | 1 |
| ORDINARY | HIGH DENSITY OF PM2.5 OR THE LIKE. | PM2.5 MONITOR CHANGES TO ORANGE OR RED, AND DISPLAY OF PM2.5 NUMERIC VALUE IS FORCED TO START. | • PM2.5 MONITOR CHANGES TO ORANGE OR RED.<br>• 1 HOUR HAS ELAPSED SINCE PREVIOUS SAME UTTERANCE. | 1 |

FIG. 7

NOTICE

| JINGLE | UTTERANCE TEXT | UTTERANCE CONDITION (1) (TRIGGER) | UTTERANCE CONDITION (2) | PRIORITY |
|---|---|---|---|---|
| GOOD | AIR HAS BEEN PURIFIED. | CLEAN MONITOR CHANGES TO LIGHT BLUE. | AFTER ANY OF VOICES REGARDING AIR IMPURITY IS OUTPUT, CLEAN MONITOR RETURNS TO LIGHT BLUE. | 1 |
| GOOD | HAPPY TO HAVE CLEAN AIR IN ROOM. WILL CIRCULATE AIR FOR MORE CAREFUL OPERATION. | AUTOMATIC CIRCULATION MODE IS STARTED. | • LIGHT INTENSITY SENSOR INDICATES "LIGHT", AND OPERATION IS PERFORMED IN MACHINE'S CHOICE MODE<br>• LIGHT BLUE ON CLEAN MONITOR CONTINUES FOR 3 HOURS. | 1 |
| GOOD | AIR IS VERY VERY CLEAN RECENTLY~. | CLEAN MONITOR STILL ILLUMINATES LIGHT BLUE. | • AFTER OPERATION IN THOROUGH CIRCULATION MODE IS PERFORMED TWO TIMES, LIGHT BLUE ON CLEAN MONITOR CONTINUES FOR 2 HOURS.<br>• 48 HOURS OR LONGER HAVE ELAPSED SINCE PREVIOUS SAME UTTERANCE. | 1 |
| ORDINARY | TANK IS EMPTY. | NO WATER | • AFTER 30 MINUTES AFTER CHANGE FROM FILLED TO NO WATER,<br>• OPERATION IS PERFORMED IN MODE OF HUMIDIFICATION AFTER REFILLING AND AT TEMPERATURE AND HUMIDITY FOR THE SAME. | |

FIG. 8

SLEEP

| JINGLE | UTTERANCE TEXT | UTTERANCE CONDITION (1) (TRIGGER) | UTTERANCE CONDITION (2) | PRIORITY |
|---|---|---|---|---|
| ORDINARY | GOOD NIGHT. | ROOM BRIGHTNESS: FROM LIGHT TO DARK | • MODE OF EFFECT REALIZATION (ONLY KI-HP100), MACHINE'S CHOICE, AUTO, SLEEP, POLLEN, OR SILENT | 1 |
| GOOD | THANK YOU FOR TODAY. | ROOM BRIGHTNESS: FROM LIGHT TO DARK | • MODE OF EFFECT REALIZATION (ONLY KI-HP100), MACHINE'S CHOICE, AUTO, POLLEN, OR SILENT | 1 |
| GOOD | SLEEP WELL. ROOM MIGHT BE A LITTLE COLD. | ROOM BRIGHTNESS: FROM LIGHT TO DARK | • MODE OF EFFECT REALIZATION (ONLY KI-HP100), MACHINE'S CHOICE, AUTO, SLEEP, POLLEN, OR SILENT AND 13°C OR LOWER | 2 |
| ORDINARY | ROOM IS DARK. WHEN TEMPERATURE AND HUMIDITY ARE HIGH, NOTICE WILL BE GIVEN WITH LOW VOLUME. | ROOM BRIGHTNESS: FROM LIGHT TO DARK | • EFFECT REALIZATION MODE (ONLY KI-HP100), WATCH MODE ON, VOLUME HIGH OR MEDIUM, AND WBGT LEVEL B OR HIGHER | 3 |

FIG. 9

WATCH

| JINGLE | UTTERANCE TEXT | UTTERANCE CONDITION (1) (TRIGGER) | UTTERANCE CONDITION (2) | PRIORITY |
|---|---|---|---|---|
| ORDINARY | ROOM IS DRY. WILL HUMIDIFY ROOM IMMEDIATELY. | LOWER THAN ABSOLUTE HUMIDITY OF 7g (DRY) | • WHEN STATE TRANSITIONS TO STATE OF HUMIDITY LOWER THAN ABSOLUTE HUMIDITY OF 7g AND TEMPERATURE OF 14 DEGREES OR HIGHER, ONE UTTERANCE IS GIVEN. (IN WATCH MODE WITH HUMIDIFICATION ON AND DURING OPERATION, MODE OF MACHINE'S CHOICE, AUTO, OR SLEEP, OR WITH WATER FILLED | 2 |
| ORDINARY | ROOM TEMPERATURE IS LOW. | LOWER THAN ABSOLUTE HUMIDITY OF 7g (LOW TEMPERATURE) | • CONFORM TO WATCH BEEP CONDITION ONLY INITIAL TRANSITION TO LOW TEMPERATURE | 1 |
| ORDINARY | ROOM TEMPERATURE AND HUMIDITY ARE HIGH. | WBGT LEVEL C | • CONFORM TO WATCH BEEP CONDITION | 1 |
| ORDINARY | ROOM TEMPERATURE AND HUMIDITY ARE HIGH. | WBGT LEVEL D | • CONFORM TO WATCH BEEP CONDITION ONLY INITIAL TRANSITION TO LEVEL D | 1 |

FIG. 10

GUIDANCE

| JINGLE | UTTERANCE TEXT | UTTERANCE CONDITION (1) (TRIGGER) | UTTERANCE CONDITION (2) | PRIORITY |
|---|---|---|---|---|
| GUIDANCE | HUMIDIFICATION CARE LAMP ILLUMINATES. PLEASE CLEAN WET AREA. | HUMIDIFICATION CARE LAMP FROM OFF TO ON (HUMIDIFICATION IS PERFORMED) | | 3 |
| GUIDANCE | IONIZATION UNIT IS TO BE REPLACED SOON. | UNIT REPLACEMENT LAMP FROM OFF TO SLOW FLASHING | | 4 |
| GUIDANCE | UNIT REPLACEMENT LAMP IS FLASHING. REPLACE UNIT WITH REFERENCE TO INSTRUCTION MANUAL. | UNIT REPLACEMENT LAMP FROM SLOW FLASHING TO QUICK FLASHING | | 5 |
| GUIDANCE | DUST BOX LAMP IS FLASHING. PLEASE THROW AWAY DUST IN DUST BOX. | DUST BOX LAMP FROM OFF TO ON | | 2 |

FIG. 11

AUTOMATIC PRE-FILTER CLEANING

| JINGLE | UTTERANCE TEXT | UTTERANCE CONDITION (1) (TRIGGER) | UTTERANCE CONDITION (2) | PRIORITY |
|---|---|---|---|---|
| ORDINARY | WILL CLEAN PRE-FILTER. | *ELAPSE OF CUMULATIVE OPERATING HOURS OF 48 HOURS SINCE PREVIOUS CLEANING, OR THE LIKE | START OF AUTOMATIC PRE-CLEANING FILTER CLEANING | 1 |
| ORDINARY | WILL CLEAN PRE-FILTER BECAUSE PRE-FILTER HAS NOT BEEN CLEANED FOR A WHILE. | *START OF 720-HOUR FORCED CLEANING | START OF AUTOMATIC PRE-CLEANING FILTER CLEANING | 2 |
| ORDINARY | PRE-FILTER CLEANING IS COMPLETE. PRE-FILTER IS CLEAN. | *COMPLETION OF AUTOMATIC PRE-CLEANING FILTER CLEANING | | 1 |
| ORDINARY | PRE-FILTER CLEANING IS COMPLETE. PLEASE CLEAN WET AREA. | *COMPLETION OF AUTOMATIC PRE-CLEANING FILTER CLEANING | HUMIDIFICATION CARE LAMP ILLUMINATES. | 2 |

AIR PURIFIER

TECHNICAL FIELD

The present invention relates to an air purifier and particularly relates to an air purifier having an utterance function.

BACKGROUND ART

In recent years, air purifiers are equipped with various functions. For example, an air purifier having an utterance function of reporting the state of the air purifier to a user by using voice (PTL 1).

CITATION LIST

Patent Literature

PTL 1: Publication of Patent Application in Japan "Japanese Unexamined Patent Application Publication No. 2017-083165 (published on May 18, 2017)"

SUMMARY OF INVENTION

Technical Problem

In an air purifier having an utterance function, the state of the air purifier is uttered by using voice, and thereby the state of the air purifier is reported to the user. Accordingly, if there are a plurality of utterance texts indicating the respective states of the air purifier, a high priority text is preferably uttered and thereby reported to the user.

An aspect of the present invention aims to implement an air purifier capable of reliably uttering an uttered text that is a high priority text to be reported to a user.

Solution to Problem

To solve the problem described above, an air purifier according to an aspect of the present invention has an utterance function of uttering an utterance text associated with an apparatus state indicating the state of the air purifier. The air purifier includes: an apparatus state detection unit that detects the apparatus state; an utterance text extraction unit that extracts at least one utterance text associated with the apparatus state detected by the apparatus state detection unit, the apparatus state being classified as one of a plurality of types of categories, the at least one utterance text being extracted from utterance texts included in the categories; and an utterance control unit that causes the at least one utterance text extracted by the utterance text extraction unit to be uttered in descending order of priorities assigned to the categories according to one of the priorities that is assigned to one of the categories that includes the at least one utterance text.

Advantageous Effects of Invention

According to an aspect of the present invention, an uttered utterance text that is a high priority text to be reported to a user can be uttered reliably.

BRIEF DESCRIPTION OF DRAWINGS

FIG. 6 is display illustrating relationships regarding a category (Air Impurity) among an utterance text, utterance conditions, and priority.

FIG. 7 is display illustrating relationships regarding a category (Notice) among an utterance text, utterance conditions, and priority.

FIG. 8 is display illustrating relationships regarding a category (Sleep) among an utterance text, utterance conditions, and priority.

FIG. 9 is display illustrating relationships regarding a category (Watch) among an utterance text, utterance conditions, and priority.

DESCRIPTION OF EMBODIMENTS

Embodiment 1

Hereinafter, an embodiment of the present invention will be described in detail.

(Air Purifier Overview)

Figure 2:
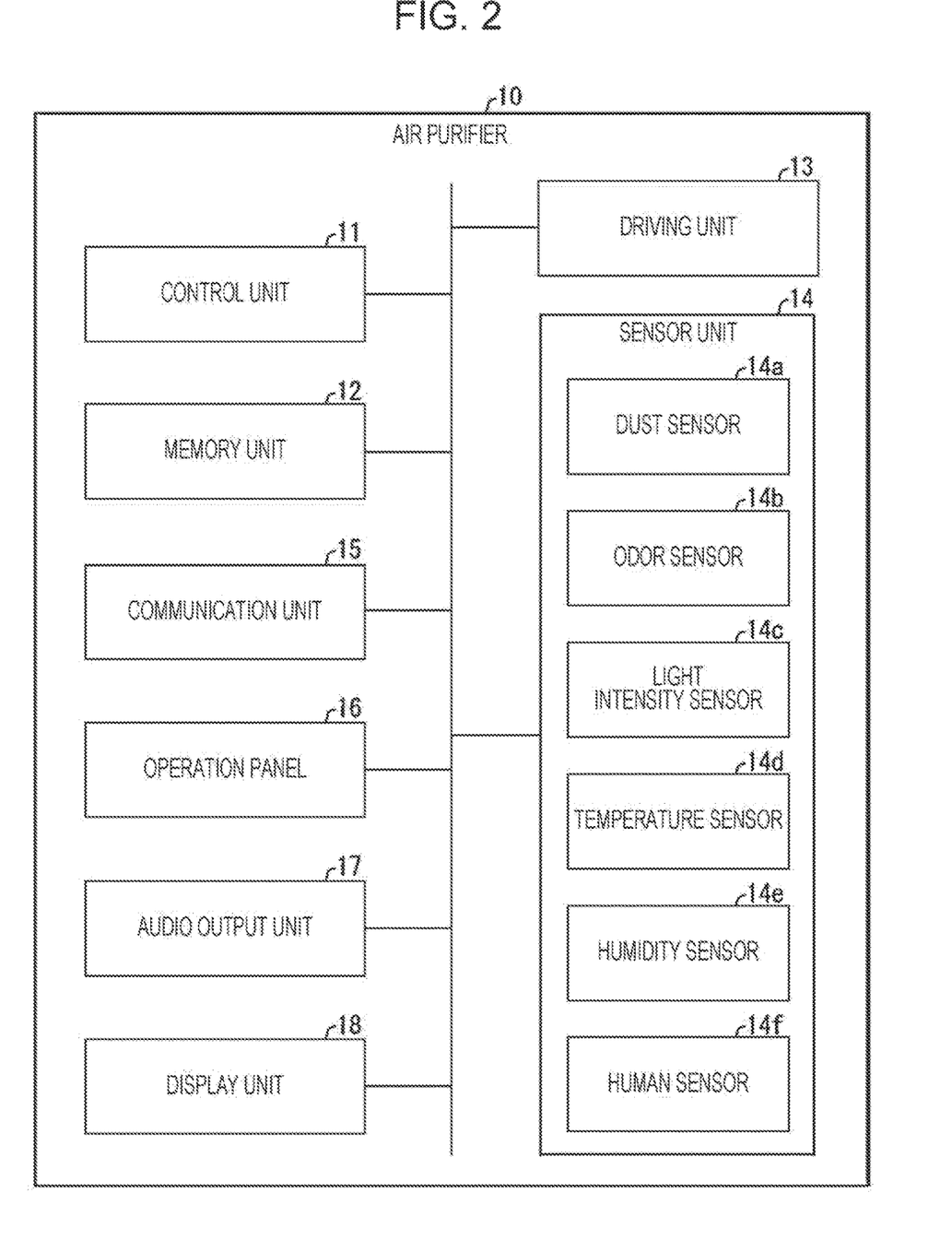
FIG. 2 is a block diagram illustrating the schematic configuration of the air purifier illustrated in FIG. 1.

FIG. 2 is a block diagram illustrating the schematic configuration of an air purifier 10. As illustrated in FIG. 2, the air purifier 10 includes a control unit 11, a memory unit 12, a driving unit 13, a sensor unit 14, a communication unit 15, an operation panel 16, and an audio output unit 17. The air purifier 10 has an utterance function of uttering an utterance text associated with an apparatus state indicating the state of the air purifier 10. The details of the utterance function will be described later.

The control unit 11 controls the operations of the components of the air purifier 10 and is composed of a computer including an arithmetic processing unit or the like such as a CPU (Central Processing Unit) or a dedicated processor. The control unit 11 comprehensively controls the operations of the components of the air purifier 10 by reading and running a program for performing various controls on the air purifier 10. The program is stored in the memory unit 12. Note that the details of the control unit 11 will be described later.

The memory unit 12 stores therein various data items used in the air purifier 10 and includes a RAM (Random Access Memory), a ROM (Read Only Memory), an HDD (Hard Disk Drive), and other components.

When being supplied with power, the driving unit 13 thereby performs air conditioning operations such as an air purification operation and a humidification operation by the air purifier 10. A ventilation fan for discharging air, a discharge device for generating ion and the like in the air, a heater for evaporating water, and the like are cited as examples of the driving unit 13. The driving unit 13 is controlled by the control unit 11.

The sensor unit 14 senses the environment of the room in a user's home 50 where the air purifier 10 is installed and further also functions as an apparatus state detection unit that detects the apparatus state indicating the state of the air purifier 10. In this embodiment, the sensor unit 14 is included in the air purifier 10 and has a dust sensor 14a that detects particles such as dust, pollen, and PM2.5 floating in the room, an odor sensor 14b for detecting odor, a light intensity sensor 14c that detects light intensity, a temperature sensor 14d that detects temperature, a humidity sensor 14e that detects humidity, and a human sensor 14f for detecting a person. Further, the sensor unit 14 may have a CO2 sensor for detecting CO2 density in the room. Note that publicly known sensors can be used as these sensors, and thus detailed description thereof is not provided.

The air purifier 10 performs the air purification operation such that the sensing level of the aforementioned particles such as dust and the sensing level of odor are respectively equal to or lower than predetermined levels. If the sensing level of light intensity is equal to or lower than a predetermined level, that is, if the room is dark, the air purifier 10 performs the air purification operation in a low power operation. As described above, the environment to be sensed by the dust sensor 14a, the odor sensor 14b, and the light intensity sensor 14c is an environment necessary for the control of the air purification operation by the air purifier 10.

The communication unit 15 performs mutual communications with a cloud server via an external network (a wide area network such as the Internet) under the control of the control unit 11.

The operation panel 16 is a user interface for performing, under the control of the control unit 11, input an instruction to the air purifier 10 by a user, reporting the state of the air purifier 10, and the like. As examples of the state of the air purifier 10, an operation mode, the temperature and the humidity in the room, a value obtained by converting power consumption into an electric charge, the degree of air impurity (such as dust and odor) in the room, whether humidification is performed, and the like are cited.

The audio output unit 17 is an audio output device such as a speaker. The control unit 11 causes voice based on voice data stored in the memory unit 12 to be output from the audio output unit 17.

Note that the air purifier 10 is configured to be operable through not only remote control from a mobile terminal 30 but also short distance wireless communication using, for example, infrared rays from a remote controller (not illustrated). Alternatively, the air purifier 10 may be operable using voice.

The air purifier 10 is provided with various members such as a filter and a water tank, although the members are not illustrated in the drawings. The filter is disposed in the passage for air in the air purifier 10 and captures the particles in the air, and the water tank stores water for the air purifier 10 to perform the humidification operation. The sensor unit 14 also has various sensors such as a sensor that senses the amount of water in the water tank and a sensor that senses the clogging of the filter. The clogging of the filter can be sensed from a change in airflow or pressure, the degree of light transmission of the filter, or the like. The sensing of the clogging of the filter is utilized for a notice prompting replacement of the filter. Note that the sensing may be utilized for a notice prompting the replacement after counting the used hours of the filter.

(Details of Air Purifier)

Figure 1:
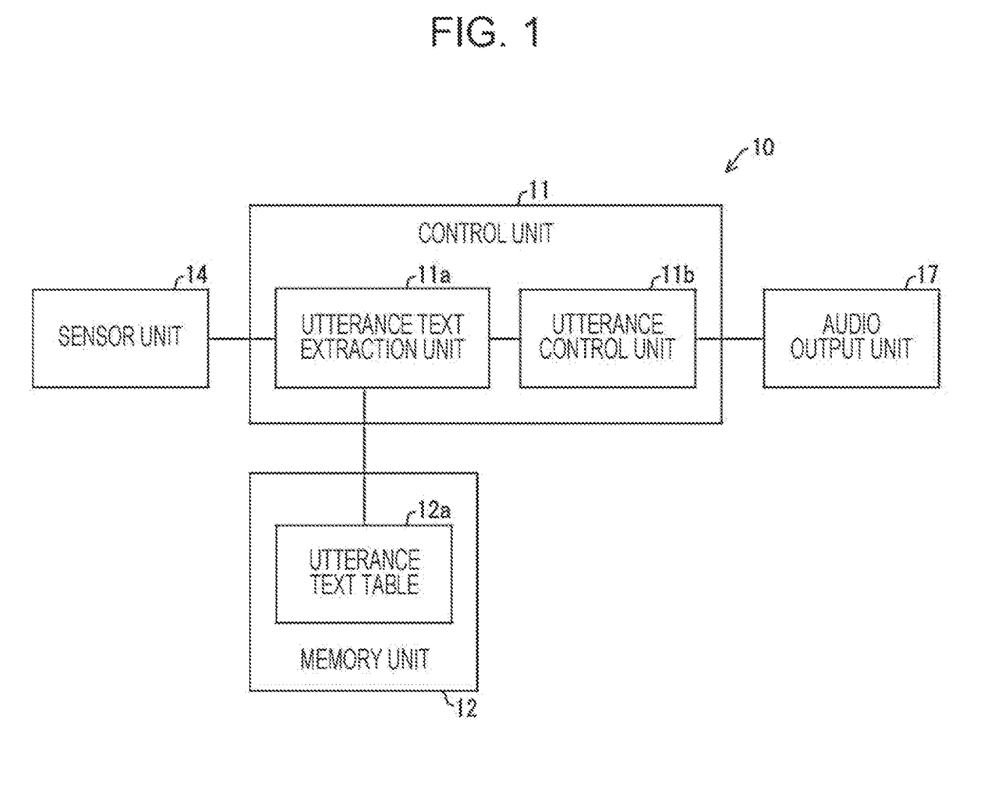
FIG. 1 is a block diagram illustrating the schematic configuration of a control unit of an air purifier according to Embodiment 1 of the present invention.

FIG. 1 is a block diagram illustrating the schematic configuration of the control unit 11 and the memory unit 12 that are provided for implementing the utterance function in the air purifier 10. As illustrated in FIG. 1, the control unit 11 includes an utterance text extraction unit 11a and an utterance control unit 11b. The memory unit 12 includes utterance text tables 12a.

Each utterance text table 12a includes utterance texts in association with utterance conditions. The details of the utterance text table 12a will be described later.

The utterance text table 12a stores a plurality of utterance texts uttered by the air purifier 10 for each of categories. Note that the categories are classified into Air Impurity, Notice, Sleep, Watch, Guidance, Temperature and Humidity Change, and the like that indicate apparatus states. Each utterance text is associated with an apparatus state indicating the state of the air purifier 10 (utterance condition). Further, each category is assigned priority, and each utterance text in the category is also assigned priority. Note that the details of the utterance text table 12a will be described later.

The utterance text extraction unit 11a extracts, from the utterance text tables 12a in the memory unit 12, at least one utterance text associated with apparatus data (a detection signal) indicating an apparatus state and sensed (detected) by the sensor unit 14 and transmits the extracted utterance text to the utterance control unit 11b.

The utterance control unit 11b causes the audio output unit 17 to utter the utterance text extracted by the utterance text extraction unit 11a in descending order of priority assigned to the category including the utterance text. This utterance process will be described below.

(Utterance Process Overview)

Figure 3:
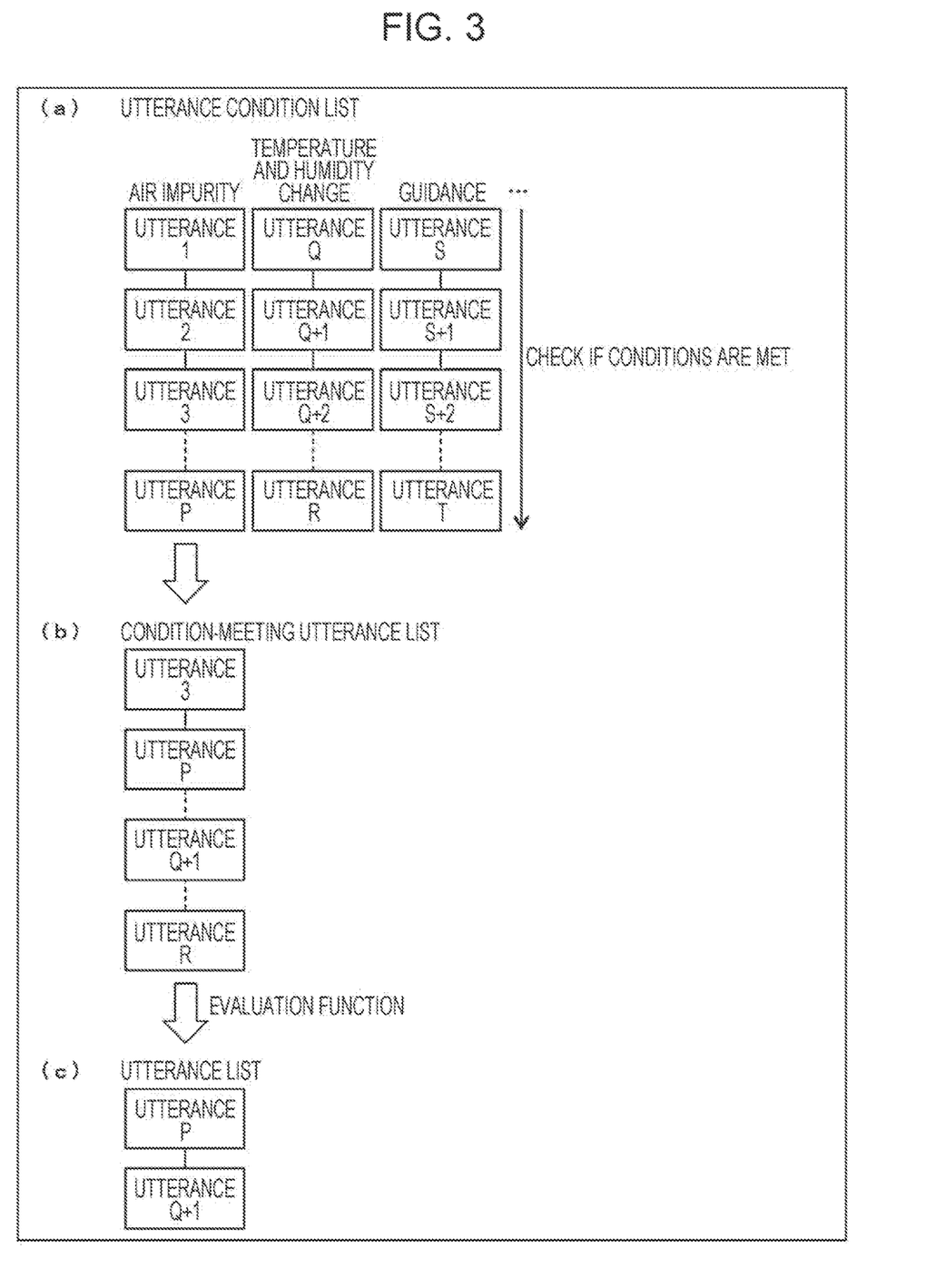
FIG. 3 is a diagram for explaining an overview of an utterance text extraction process by the control unit illustrated in FIG. 1.

FIG. 3 is a diagram for explaining an overview of the utterance process by the control unit 11 of the air purifier 10 having the aforementioned configuration.

First, the utterance text extraction unit 11a extracts utterance texts meeting utterance conditions from utterance texts classified for each of categories illustrated in part (a) of FIG. 3. Note that an utterance text meeting an utterance condition is an utterance text associated with an apparatus state indicating the state of the air purifier 10 and obtained from a result of the sensing performed by the sensor unit 14. Utterance texts meeting the utterance conditions are herein extracted from utterance texts (utterances 1, 2, . . . , and P, utterances Q, Q+1, . . . , and R, and utterances S, S+1, . . . , and T) included in the categories such as Air Impurity, Temperature and Humidity Change, and Guidance, and a list of utterance texts meeting the conditions and illustrated in part (b) of FIG. 3 is generated. Note that the apparatus state also includes a signal representing the operation state of the air purifier 10 (such as a signal representing an operation mode or a signal resulting from an operation of the operation panel 16).

Subsequently, the utterance text extraction unit 11a further extracts a plurality of extracted utterance texts from the list illustrated in part (b) of FIG. 3 by using an evaluation function and generates a list of utterances illustrated in part (c) of FIG. 3. Note that the evaluation function is a function for extracting a high priority utterance text based on the priority assigned to the utterance text.

Lastly, the utterance control unit 11*b* causes the audio output unit 17 to utter utterance texts included in the utterance list illustrated in part (c) of FIG. 3. The order of utterances at this time is a descending order of priorities respectively assigned to the categories including the utterance texts.

Basically, the utterance by the air purifier 10 is caused by an utterance trigger. Relationships between the type of the utterance trigger and an utterance category (utterance text) associated with the utterance trigger are illustrated as in FIG. 4.

Figure 4:
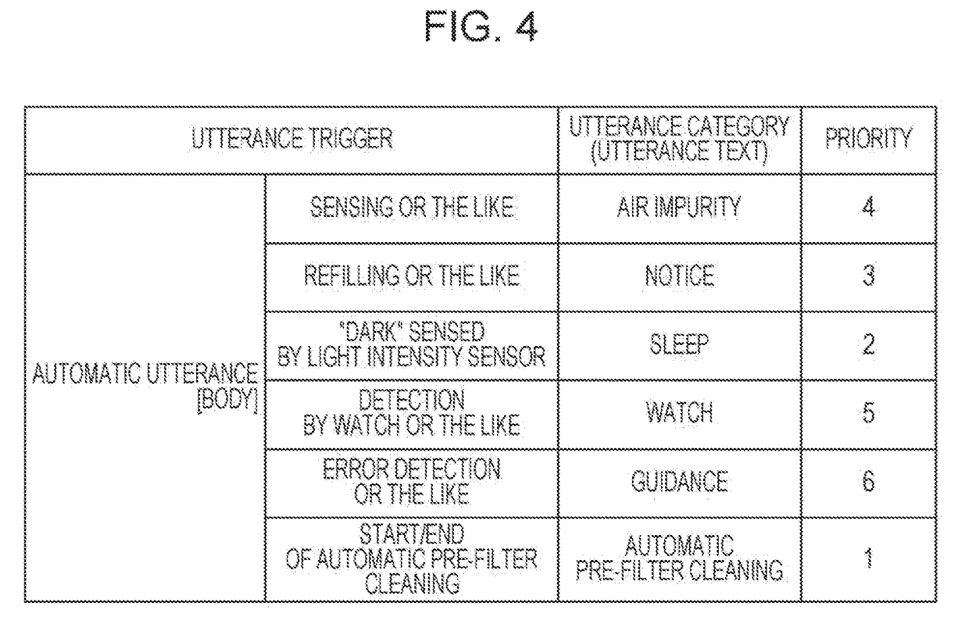
FIG. 4 is a display illustrating relationships among an utterance trigger, an utterance category, and priority.

FIG. 4 is a table illustrating relationships among an utterance trigger, an utterance category, and priority for performing automatic utterance. The automatic utterance refers to utterance automatically reporting a text to be reported to the user by the air purifier 10 in accordance with the result of the sensing performed by the sensor unit 14, not utterance given when the user performs operation.

Sensing or the like serving as an utterance trigger is associated with "Air Impurity" as an utterance category, refilling or the like as an utterance trigger is associated with "Notice" as an utterance category, "dark" sensed by the light intensity sensor as an utterance trigger is associated with "Sleep" as an utterance category, a detection by watch or the like as an utterance trigger is associated with "Watch" as an utterance category, an error detection or the like as an utterance trigger is associated with "Guidance" as an utterance category, and the start/end of automatic pre-filter cleaning as an utterance trigger is associated with "Automatic Pre-filter Cleaning" as an utterance category.

Each utterance category is assigned a numerical value as priority as illustrated in FIG. 4. The order of giving utterances is decided in descending order of priorities (in descending order of numerical values). Each utterance category includes utterance texts. For example, when the utterance trigger "Refilling or the like" works, utterance of the utterance text included in the utterance category "Notice" is prepared. When another utterance trigger "error detection or the like" works, an utterance text included in the utterance category "Guidance" is uttered prior to the utterance text included in the utterance category "Notice" because the priority for the utterance category "Guidance" is 6 and higher than the priority for the utterance category "Notice" of 3. The utterance text included in "Notice" is then uttered.

Note that utterance texts included in each utterance category are also assigned respective priorities. The order of giving utterances in the utterance categories is decided based on the priority. In a plurality of utterance texts in the same utterance category, an utterance text assigned a high priority (high numerical value) is selected, and the other utterance texts are not selected. However, if the utterance texts have the same priority, an utterance text to be uttered is randomly selected. The utterance texts in each utterance category are described with reference to FIGS. 6 to 11 (described later).

(Details of Utterance Process)

The details of the utterance process in this embodiment will hereinafter be described with reference to FIGS. 5 to 11.

Figure 5:
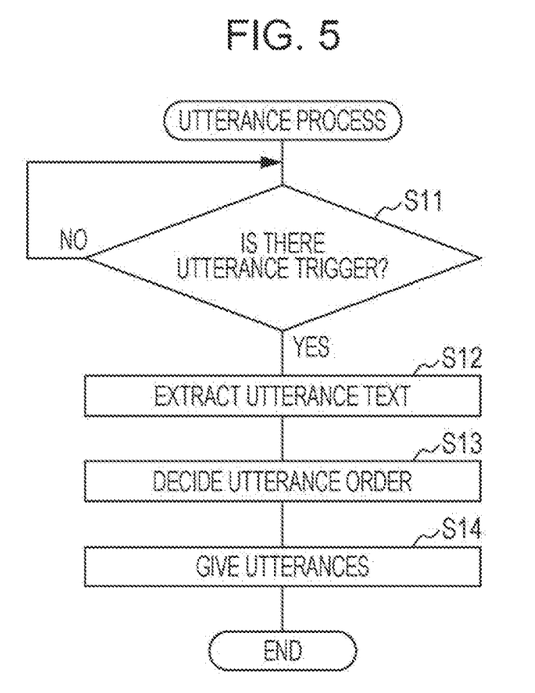
FIG. 5 is a flowchart illustrating the flow of an utterance process executed by the control unit illustrated in FIG. 1.

FIG. 5 is a flowchart illustrating the flow of the utterance process executed by the control unit 11.

FIG. 6 is a table illustrating utterance texts in the utterance category "Air Impurity" together with two utterance conditions, priority, and a sound (jingle) used when the corresponding utterance is given.

FIG. 7 is a table illustrating utterance texts in the utterance category "Notice" together with two utterance conditions, priority, and a sound (jingle) used when the corresponding utterance is given.

FIG. 8 is a table illustrating utterance texts in the utterance category "Sleep" together with two utterance conditions, priority, and a sound (jingle) used when the corresponding utterance is given.

FIG. 9 is a table illustrating utterance texts in the utterance category "Watch" together with two utterance conditions, priority, and a sound (jingle) used when the corresponding utterance is given.

Figure 10:
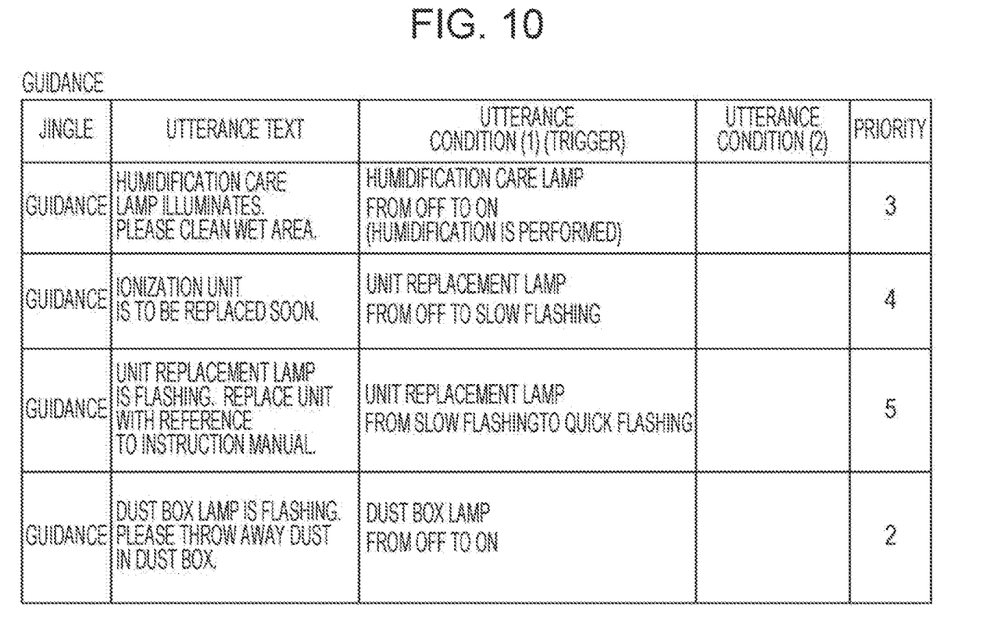
FIG. 10 is display illustrating relationships regarding a category (Guidance) among an utterance text, utterance conditions, and priority.

FIG. 10 is a table illustrating utterance texts in the utterance category "Guidance" together with two utterance conditions, priority, and a sound (jingle) used when the corresponding utterance is given.

Figure 11:
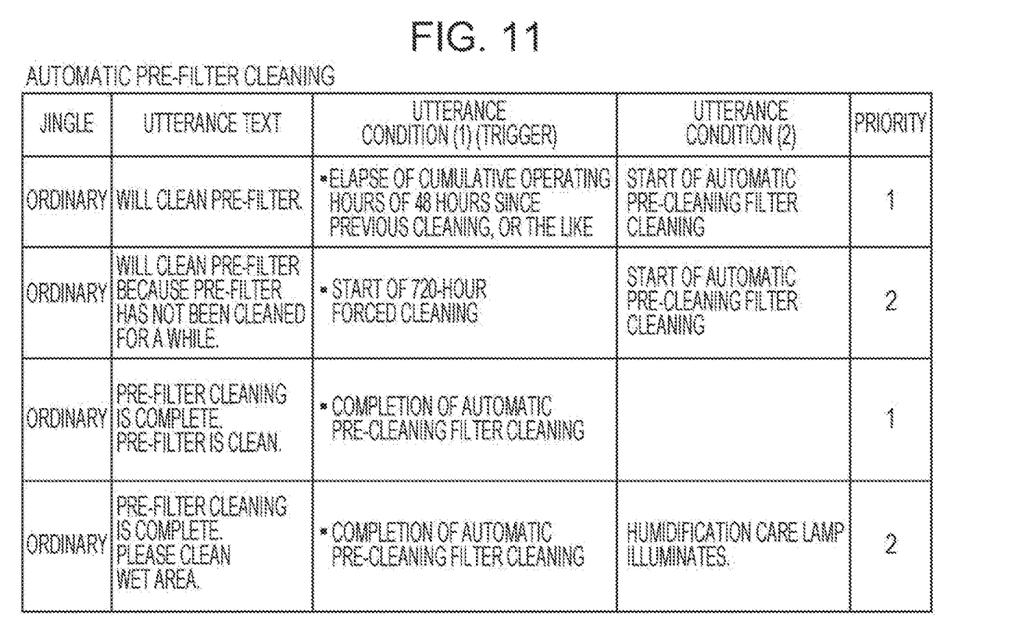
FIG. 11 is display illustrating relationships regarding a category (Automatic Pre-filter Cleaning) among an utterance text, utterance conditions, and priority.

FIG. 11 is a table illustrating utterance texts in the utterance category "Automatic Pre-filter Cleaning" together with two utterance conditions, priority, and a sound (jingle) used when the corresponding utterance is given.

Note that the tables illustrated in FIGS. 6 to 11 are each stored as the utterance text table 12*a* in the memory unit 12.

First, the utterance text extraction unit 11*a* determines whether there is at least one utterance trigger as illustrated in FIG. 5 (step S11). The utterance text extraction unit 11*a* here determines whether any one of the utterance triggers illustrated in FIG. 4 works.

If the utterance text extraction unit 11*a* determines in step S11 that there is at least one utterance trigger (Yes), the utterance text extraction unit 11*a* extracts at least one utterance text (step S12). The utterance text extraction unit 11*a* here determines the utterance trigger in the utterance triggers described in the table illustrated in FIG. 4 and extracts an utterance text associated with the determined utterance trigger and included in the utterance category. The utterance text is here decided based on the utterance condition (1) and the utterance condition (2) that are the utterance triggers and that are illustrated in FIGS. 6 to 11, and the decided utterance text is extracted. For example, if the utterance category is "Air Impurity", and when it is determined that, as illustrated in FIG. 6, a change of a monitor to red is detected as the utterance condition (1) serving as the utterance trigger and that, as the utterance condition (2), an odor monitor illuminates orange, a PM2.5 monitor lamp is off, and three hours have elapsed since the previous utterance from the "clean monitor", the utterance text extraction unit 11*a* decides "Found air impurity. Will clean air immediately." as an utterance text and extracts the determined utterance text. In the case of a different utterance category, the utterance text extraction unit 11*a* extracts an utterance text in the same manner.

Note that in this embodiment, if both of the utterance condition (1) and the utterance condition (2) are met, an utterance text can be decided. However, the embodiment is not limited to this. If both of the utterance condition (1) and the utterance condition (2) are met, two or more utterance texts may be decided. In this case, priorities may be assigned to the utterance texts, and utterance texts assigned high priorities may be decided as utterance texts. Further, if two or more utterance texts are decided, and if each of the utterance texts has the same priority, an utterance text may be decided randomly.

Next, if the utterance text is extracted in step S12, the utterance control unit 11*b* determines the utterance order (step S13). Here, among the plurality of utterance texts extracted by the utterance text extraction unit 11*a*, the utterance control unit 11*b* decides the order of giving utterances by the audio output unit 17 in order from the utterance text having the highest priority in priorities assigned to the respective utterance categories.

Lastly, the utterance control unit 11b causes the audio output unit 17 to utter utterance texts in accordance with the decided utterance order (step S14).

(Advantageous Effects)

According to the air purifier 10 described above, the utterance texts respectively associated with the apparatus states detected by the sensor unit 14 are uttered in descending order of the priorities assigned to the categories including the utterance texts. This enables a high priority utterance text to be uttered and to be reported to the user.

Further, if there are a plurality of utterance texts extracted by the utterance text extraction unit 11a in the same category, only the utterance text with the highest priority in priorities assigned in advance to the utterance texts is to be uttered, and thereby the user can listen to only the high priority utterance text even in the same category.

Accordingly, the user only listens to the utterance text uttered by the air purifier 10 and thereby can know the current state of the air purifier 10 more reliably.

Note that in the tables illustrated in FIGS. 6 to 11, a jingle is set for each utterance text, and utterance is given with a jingle set for the utterance text. Specifically, if the jingle is "ordinary", utterance is given with an ordinary voice when the utterance text is uttered. If the jingle is "good", utterance is given with a more cheerful voice than in the ordinary case when the utterance text is uttered. If the jingle is "guidance", utterance is given with a mechanically sounding voice or with an ordinary voice when the utterance text is uttered. Specifically, the jingles are equivalent to matters representing feelings (emotions) of humans. If the jingle is "ordinary", utterance is given with voice that does not sound like any of the emotions. If the jingle is "good", utterance is given with voice that sounds like pleasure.

As described above, in this embodiment, the feelings are set in advance as jingles for the utterance texts. In the following embodiment, an example in which regardless of the utterance text, a feeling is set and utterance is given with a voice with the set feeling will be described.

Embodiment 2

Another embodiment of the present invention will be described below. Note that for convenience of explanation, members having the same functions as those of the respective members described in the aforementioned embodiment are denoted by the same reference numerals, and description thereof is not repeated.

(Details of Air Purifier)

Figure 12:
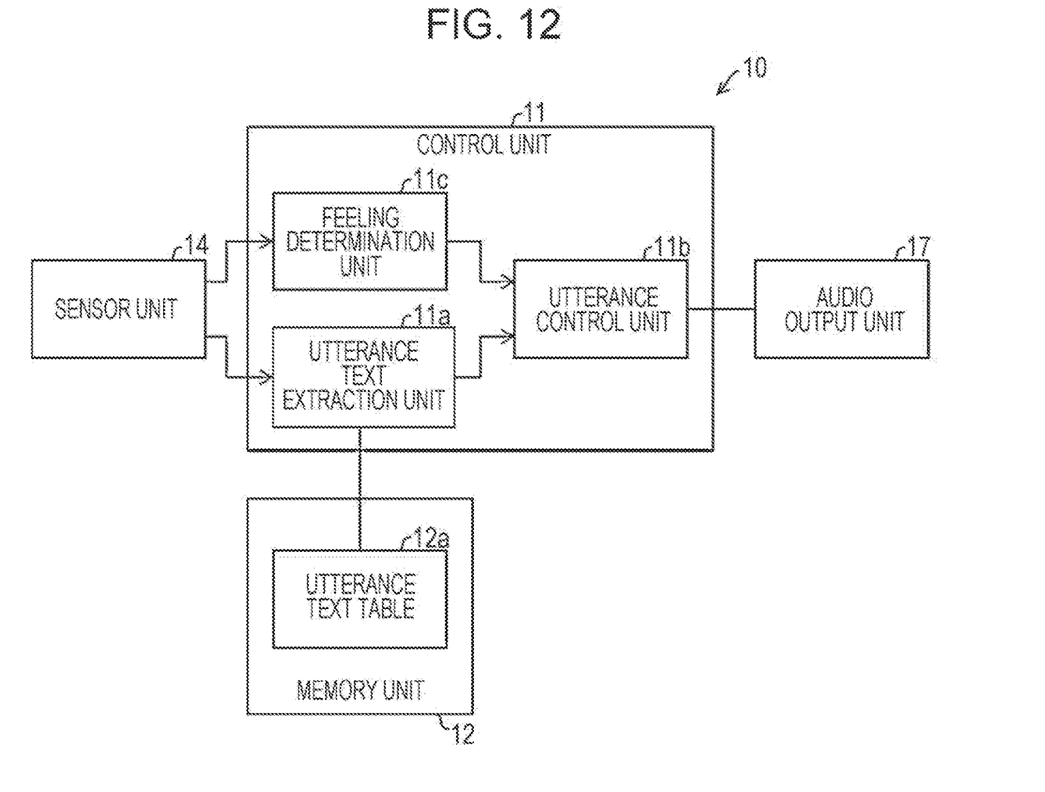
FIG. 12 is a block diagram illustrating the schematic configuration of a control unit of an air purifier according to Embodiment 2 of the present invention.

FIG. 12 is a block diagram illustrating the schematic configuration of a control unit 11 and the memory unit 12 in an air purifier 10 according to this embodiment. In this embodiment, the control unit 11 is the same as the control unit 11 in Embodiment 1 described above except that a feeling determination unit 11c is added. In addition, as the utterance text tables 12a, the same utterance text tables 12a in Embodiment 1 described above are used. However, in this embodiment, jingle parts described in the tables stored as the utterance text tables 12a and illustrated in FIGS. 6 to 11 are not used.

The feeling determination unit 11c determines a feeling of the air purifier 10 associated with an apparatus state detected by the sensor unit (apparatus state detection unit) 14. Specifically, the feeling determination unit 11c numerically expresses sensor information (apparatus state) detected by the sensor unit (apparatus state detection unit) 14 and determines whether a feeling set in advance based on a numerical value representing the apparatus state is present. In this embodiment, there are four types of feelings that are happiness, anger, sadness, and an ordinary state, but the feelings are not limited to these and may include "fun". Information indicating a feeling determined to be present by the feeling determination unit 11c is transmitted to the utterance control unit 11b.

The utterance control unit 11b causes the audio output unit 17 to utter the utterance text extracted by the utterance text extraction unit 11a with a feeling determined to be present by the feeling determination unit 11c.

(Utterance Process Overview)

Figure 13:
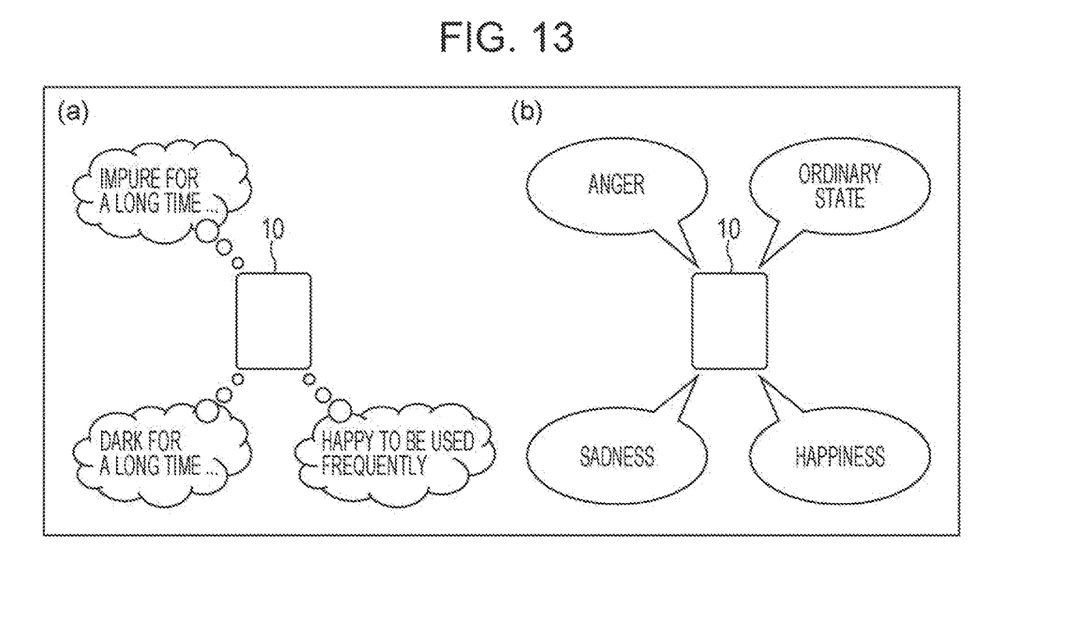
FIG. 13 is an image view illustrating the content of a process executed in this Embodiment 2.

FIG. 13 is an image view illustrating the feelings of the air purifier 10.

Specifically, as illustrated in part (a) of FIG. 13, the air purifier 10 acquires information indicating one of the feelings such as "Impure for a long time", "Dark for a long time", or "Happy to be used frequently" from the result of sensing by the sensor unit 14 and gives utterance with one of the feelings of happiness, anger, sadness, and an ordinary state as illustrated in part (b) of FIG. 13. For example, if the information "Impure for a long time" is acquired, the air purifier 10 gives utterance with the angry feeling. If the information "Dark for a long time" is acquired, the air purifier 10 gives utterance with the sad feeling. If the information "Happy to be used frequently" is acquired, the air purifier 10 gives utterance with the happy feeling.

For example, if, in a period set in advance, the number of times the operation panel 16 is operated (the degree of happiness) exceeds the number of times (a threshold) set in advance, the feeling determination unit 11c determines that the number of times corresponds to "Happy to be used frequently". Specifically, if the feeling determination unit 11c determines that the degree of happiness exceeds the threshold, that is, if the feeling determination unit 11c determines that the feeling "happiness" is present, the utterance control unit 11b causes utterance to be given with the feeling "happiness".

In addition, if a period in which a detection value (the degree of "sadness") detected by the light intensity sensor 14c is equal to or lower than a value set in advance exceeds a predetermined period (threshold), the feeling determination unit 11 determines that the detection value corresponds to "Dark for a long time". Specifically, if the feeling determination unit 11c determines that the degree of "sadness" exceeds the threshold, that is, the feeling determination unit 11c determines that the feeling "sadness" is present, the utterance control unit 11b causes utterance to be given with the feeling "sadness".

Further, if a period in which the degree of air impurity (degree of "anger") obtained by integrating results of detection by the dust sensor 14a and the odor sensor 14b into one is equal to or higher than a value set in advance exceeds a predetermined period (threshold), the feeling determination unit 11 determines that the period corresponds to "Impure for a long time". Specifically, if the feeling determination unit 11c determines that the degree of "anger" exceeds the threshold, that is, the feeling determination unit 11c determines that the feeling "anger" is present, the utterance control unit 11b causes utterance to be given with the feeling "anger".

The above-described configuration enables a feeling to be changed in accordance with the state of air impurity when utterance is given. For example, if the air impurity state lasts for a long time, utterance can be given with "anger" due to fatigue. If the air is successfully cleaned, utterance can be given with the feeling "happiness".

In addition, to give utterance, the feeling can be changed depending on the temperature of the air and a humidity state. For example, based on results of the detection by the temperature sensor 14*d* and the humidity sensor 14*e*, utterance is given with the feeling "anger" due to discomfort if a discomfort state lasts or with the feeling "happiness" in the opposite case.

Further, to give utterance, the feeling can be changed depending on the light/dark state of the room. For example, if the room is dark for a long time, utterance is given with the feeling "sadness" based on the result of detection by the light intensity sensor 14*c*.

To give utterance, the feeling can also be changed depending on the use state of the air purifier 10. For example, in a case where there are a large number of passersby based on a result of detection by the human sensor 14*f*, the number of times a switch or the like of the operation panel 16 is operated, or the like or where the switch is pressed frequently, utterance is given with the feeling "happiness". Alternatively, in the opposite case, utterance is given with the feeling "sadness".

The criterion for deciding a feeling may also be changed. In this case, the change is implemented by changing a threshold for determining whether a feeling is present by the feeling determination unit 11*c*. The determined feeling can thereby be made different, and thus the air purifier 10 can be made to appear as if the personality thereof were changed like humans.

To utter an utterance text with feeling, voices each in advance assigned three respective types of feelings (happiness, anger, and sadness) are registered in each utterance text table 12*a* for each utterance text. The utterance is implemented in such a manner that an utterance text with a feeling determined by the feeling determination unit 11*c* is extracted from the corresponding utterance text table 12*a*. That is, the utterance is implemented in such a manner that the three types of feelings are prepared in each utterance text table 12*a* for each utterance text and that the feeling determination unit 11*c* extracts an utterance text with one of the feelings as necessary.

Note that in addition to the method described above, utterance may be given in such a manner that an utterance text is assigned a feeling in such a manner that the wavelength of the frequency of a voice with the utterance text is changed.

(Details of Utterance Process)

Hereinafter, the details of the utterance process in this embodiment will be described with reference to a flowchart illustrated in FIG. 14. Note that the utterance text tables 12*a* storing utterance texts are the same as those in Embodiment 1 described above and that are illustrated in FIGS. 6 to 11.

Figure 14:
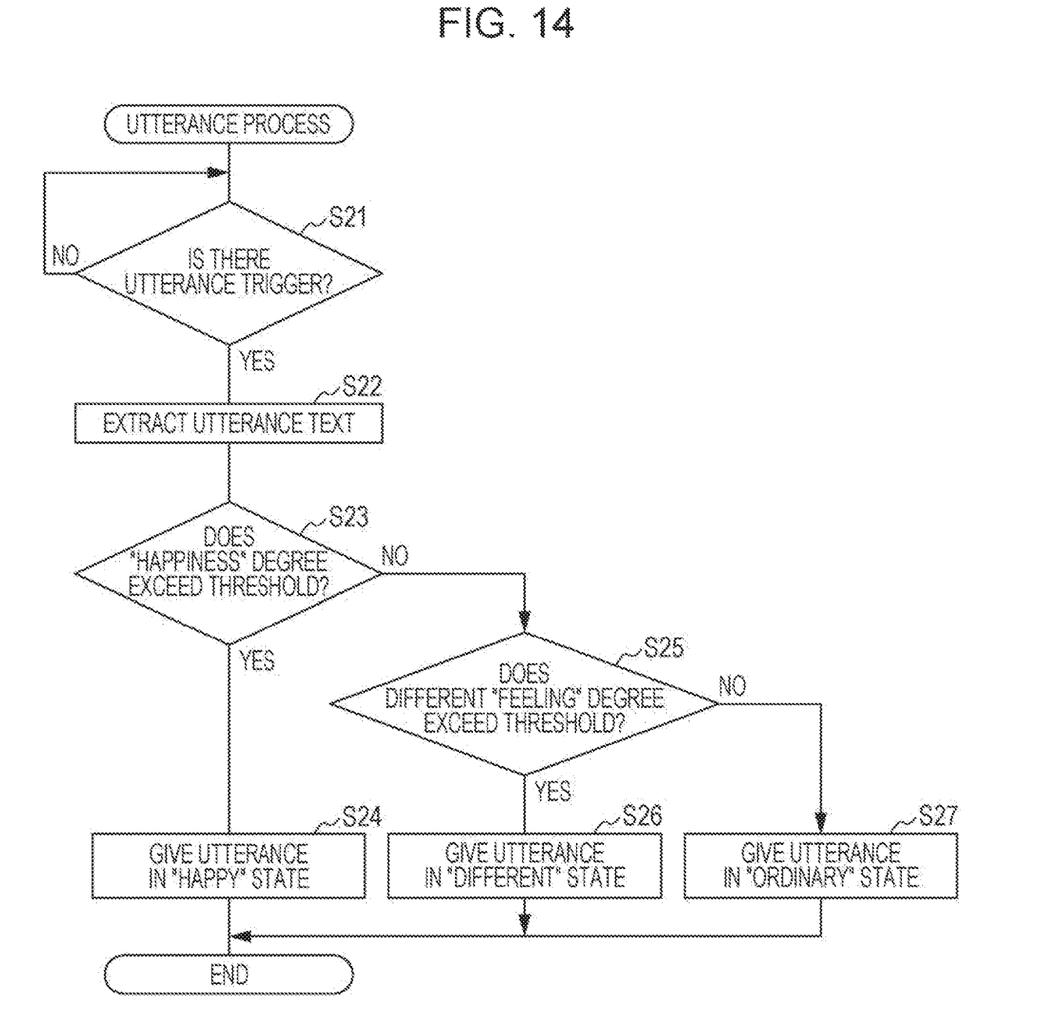
FIG. 14 is a flowchart illustrating the flow of an utterance process executed by the control unit illustrated in FIG. 12.

First, as illustrated in FIG. 14, the utterance text extraction unit 11*a* determines whether there is an utterance trigger (step S21). The utterance text extraction unit 11*a* here determines whether any one of the utterance triggers illustrated in FIG. 4 in Embodiment 1 described above works.

If it is determined that there is an utterance trigger (Yes) in step S21, the utterance text extraction unit 11*a* extracts an utterance text (step S22). The processing here is the same as that in step S12 illustrated in FIG. 5 in Embodiment 1 described above. Accordingly, detailed description of step S22 is not provided.

Subsequently, for the utterance text extracted in step S22, the feeling determination unit 11*c* determines whether the degree of happiness exceeds the threshold (step S23). If the degree of happiness here exceeds the threshold, it is determined that the feeling "happiness" is present, and the utterance control unit 11*b* causes utterance to be given in a "happiness" state (step S24). Specifically, the utterance is given with the utterance text extracted in step S22 being assigned the feeling "happiness".

In contrast, if the degree of happiness does not exceed the threshold in step S23, it is determined that the feeling "happiness" is not present. The process moves to step S25, and it is determined whether the degree of a different "feeling" exceeds the corresponding threshold. Note that the different "feeling" denotes one of the above-described feelings of happiness, anger, and sadness except "happiness"

If the degree of a different "feeling" exceeds the threshold in step S25, it is determined that a different "feeling" is present, and utterance is given in a different "feeling" state (step S26). Specifically, utterance is given with the utterance text extracted in step S22 assigned the same feeling as the feeling of anger or sadness that is determined in step S25.

In contrast, if the degree of a different "feeling" does not exceed the threshold in step S25, it is determined that any of the feelings is not present, and utterance is given in the "ordinary" state (step S27). Specifically, the utterance is given with the utterance text extracted in step S22 not being assigned any of the feelings of happiness, anger, and sadness.

Note that in the utterance process described above, the degree of "happiness" is first determined, and thereafter the degree of a different feeling is determined. However, the utterance process is not limited to this. The degree of any of the feelings of anger and sadness may be determined first, or the degrees of the feeling of happiness and any one of the feelings of anger and sadness may be determined concurrently.

The feeling is determined based on numerically expressed data; however, the determination is not limited to this. A different method for determining a feeling may be used.

(Advantageous Effects)

According to the air purifier 10 having the above described configuration, giving utterance with a feeling assigned to an utterance text associated with an apparatus state enables the user to know the apparatus state more easily. For example, as described above, if a filter is clogged and is thus in a dirty state for a long time, uttering the utterance text "The filter is in a dirty state for a long time" with the feeling "anger" enables the user to realize that the filter needs to be replaced.

Generally, an utterance text with a feeling is implemented by performing arithmetic operations using various parameters, for example, as described in Japanese Unexamined Patent Application Publication No. 2003-233388. In contrast in this embodiment, an utterance text is registered in advance with voice with a feeling, and the registered voice is merely used as necessary. Complicated arithmetic operations are not needed.

Note that in the description in this embodiment, one threshold for determining whether a feeling is present is used; however, the threshold is not limited to this. Two or more thresholds may be used to express the feeling in accordance with the stage. For example, assume a case of two thresholds for determining the degree of happiness. If the degree of "happiness" exceeds the first threshold but does not exceed the second threshold, the feeling "happiness" is made modest. If the degree of "happiness" exceeds the second threshold, the feeling "happiness" is exaggerated. As described above, expressing a feeling in accordance with the stage by using a plurality of thresholds when the feeling is determined enables the user to feel and know the current state of the apparatus state.

If a plurality of utterance texts are extracted in step S22, the order of giving utterances needs to be decided. In this embodiment, in the same manner as in Embodiment 1 described above, the utterances are given in order from the highest in priorities assigned to the utterance categories including the utterance texts. In other words, utterances are given in the decided order with voices with respective feelings.

An example in which priority is changed because of addition of a feeling will be described for Embodiment 3 below.

Embodiment 3

Another embodiment of the present invention will be described below. Note that for convenience of explanation, members having the same functions as those of the respective members described in the aforementioned embodiments are denoted by the same reference numerals, and description thereof is not repeated.

The air purifier 10 having basically the same configuration as in Embodiments 1 and 2 described above is used in this embodiment. A difference lies in that priorities are changed in such a manner feelings are added to the utterance texts for which the utterance order is decided. In this case, numerical values corresponding to the feelings are added to the priorities. As a numerical value corresponding to a feeling becomes higher, the urgency in notifying the user becomes higher. Accordingly, if the determined feeling is "Impure for a long time", the urgency in notifying the user is high, and thus the numerical value corresponding to the feeling is high. If the determined feeling is "Happy to be used frequently", the urgency in notifying the user is low, and thus the numerical value corresponding to the feeling is also low.

If the utterance text extraction unit 11a extracts, for example, three utterance texts A, B, and C, if the priorities of the categories are respectively 2, 3, and 1, and if feelings are not taken into consideration, the utterance texts B, A, and C are uttered in this order in accordance with the priorities. However, if determination of whether a feeling is present in the utterance texts A, B, C is performed, and if a numerical value associated with a feeling determined to be present is added to the priority of the corresponding utterance text, the utterance order might be changed. In this case, the value of the priority is changed depending on whether a feeling is present. However, even if a feeling is present, the value of the priority is changed also depending on the type of the feeling.

As described above, even if the utterance order of utterance texts is already decided, an utterance text to be notified to the user more preferentially, that is, an utterance text with high urgency can be uttered preferentially because the priority of an utterance text is changed depending on whether a feeling assigned to the utterance text is present and on the type of the feeling.

[Modification]

In Embodiments 1 to 3 described above, the example in which the utterance text tables 12a illustrated in FIGS. 6 to 11 are stored in the memory unit 12 in the air purifier 10 has heretofore been described. However, as illustrated in FIG. 15, the utterance texts stored in the utterance text tables 12a may be acquired from a cloud server 20 via a wide area network 60, a relay station 40, and the communication unit 15.

(Overview of Air-Conditioning Assistance System)

Figure 15:
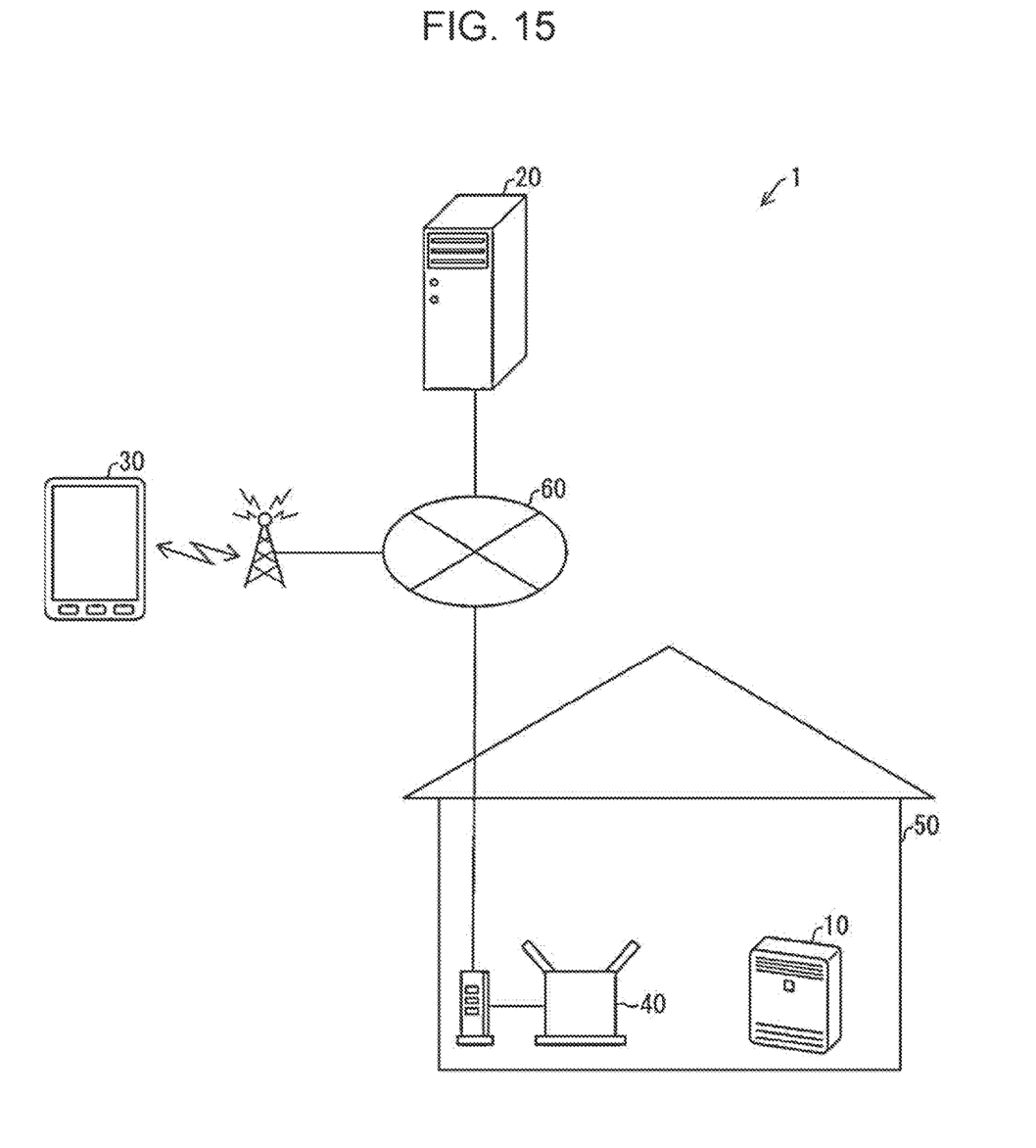
FIG. 15 is a diagram illustrating an overview of an air-conditioning assistance system according to a different embodiment of the present invention.

FIG. 15 is a diagram illustrating an overview of an air-conditioning assistance system 1. As illustrated in FIG. 15, the air purifier 10 installed in the user's home 50, the cloud server 20, and the mobile terminal 30 are connected via the wide area network 60 (communication network) in the air-conditioning assistance system 1. The air-conditioning assistance system 1 assists the air conditioning for conditioning the state of the air in the room of the user's home 50. Note that FIG. 1 illustrates the air purifier 10, the cloud server 20, the mobile terminal 30, and the user's home 50 the number of each of which is 1; however, the number and the types are not limited to these number and types.

The air purifier 10 purifies the air in the room of the user's home 50. In this embodiment, the air purifier 10 is one of so-called network consumer electronics having a wireless communication function for communicating with the cloud server 20 through connection to the wide area network 60. The wireless communication function may be incorporated into the body of the air purifier 10 or be included in a communication adapter (not illustrated) externally attached to the body of the air purifier 10. Note that the air purifier 10 has a humidification function in this embodiment but does not have to have the humidification function. In addition, the air purifier 10 is installed in the user's home 50 in this embodiment, as illustrated in FIG. 15; however, the installation place is not limited. The air purifier 10 may be installed in an office or a public place.

The mobile terminal 30 and the air purifier 10 are registered in association with each other in the cloud server 20. The mobile terminal 30 is configured to enable remote control to be performed, via the cloud server 20, on the air purifier 10 registered in association with the mobile terminal 30 in the cloud server 20. The mobile terminal 30 receives, from the cloud server 20, various pieces of information regarding the air purifier 10 registered in association with the mobile terminal 30 in the cloud server 20. A smartphone, a tablet terminal, and the like can be cited as examples of the mobile terminal 30. A plurality of air purifiers 10 can be remotely controlled from one mobile terminal 30. In addition, one air purifier 10 can be remotely controlled from a plurality of mobile terminals 30.

In addition, the utterance text tables 12a described in Embodiments 1 to 3 above are registered in the cloud server 20.

The user's home 50 is equipped with a wireless LAN (Wireless Local Area Network) that is a dedicated short range communications network. The relay station 40 in the wireless LAN is connected to the wide area network 60 including the Internet. The relay station 40 is communication equipment such as a WiFi (registered trademark) router or a WiFi (registered trademark) access point. The configuration including the Internet is illustrated as the wide area network 60 in this embodiment; however, a telephone network, a mobile communication network, a CATV (CAble TeleVision) communication network, a satellite communication network, or the like can be used.

Communications between the cloud server 20 and the air purifier 10 can be performed via the wide area network 60 and the relay station 40 in the wireless LAN. Communications between the cloud server 20 and the mobile terminal 30 can be performed via the wide area network 60. The mobile terminal 30 and the Internet in the wide area network 60 are connected to each other by using 3G (3rd Generation), LTE (Long Term Evolution), a customer premise or public WiFi (registered trademark) access point, or the like. Note that the air purifier 10 and the mobile terminal 30 are each wireless communication equipment and can communicate with each other via the relay station 40 without the wide area network 60. Note that publicly known apparatuses can be used as the cloud server 20 and the mobile terminal 30, and thus detailed description thereof is not provided.

As described above, storing the utterance text tables 12a in the cloud server 20 eliminates the need for storing the utterance text tables 12a in the air purifier 10.

[Example of Implementation by Software]

The control block (in particular, the control unit 11) of the air purifier 10 may be implemented by a logical circuit (hardware) formed on an integrated circuit (IC chip) or the like or may be implemented by software.

In the latter case, the air purifier 10 includes a computer that executes instructions of a program that is software implementing the functions. The computer includes, for example, at least one processor (control device) and also includes at least one computer readable recording medium storing the program therein. In the computer, the processor reads the program from the recording medium and runs the program, and the object of the present invention is thereby achieved. For example, a CPU (Central Processing Unit) can be used as the processor. As the recording medium, "a non-transitory tangible medium" such as not only a ROM (Read Only Memory) but also tape, a disk, a card, a semiconductor memory, and a programmable logical circuit can be used. The computer may further include a RAM (Random Access Memory) or the like for loading the program. In addition, the program may be supplied to the computer via any transmission medium (such as a communication network or a broadcast waves) capable of transmitting the program. Note that an aspect of the present invention can also be implemented in the form of a data signal embodied by electronic transmission of the program and embedded in carrier waves.

[Summarization]

An air purifier according to Aspect 1 of the present invention is the air purifier 10 that has an utterance function of uttering an utterance text associated with the apparatus state indicating the state of the air purifier 10. The air purifier includes an apparatus state detection unit (sensor unit 14) that detects the apparatus state, the utterance text extraction unit 11a that extracts at least one utterance text associated with the apparatus state detected by the apparatus state detection unit (sensor unit 14), the apparatus state being classified as one of a plurality of types of categories, the at least one utterance text being extracted from utterance texts included in the categories, and the utterance control unit 11b that causes the utterance text extracted by the utterance text extraction unit 11a to be uttered in descending order of priorities assigned to the categories according to one of the priorities that is assigned to one of the categories that includes the at least one utterance text.

According to the configuration described above, the utterance text associated with the apparatus state detected by the apparatus state detection unit is uttered in descending order of priorities assigned to the categories including the utterance texts, and thereby a high priority utterance text can be uttered and reported to the user.

An uttered text that is a high priority text to be reported to the user can thereby be uttered reliably. Accordingly, the user only listens to the utterance text uttered by the air purifier and thereby can know the current state of the air purifier reliably.

In Aspect 1 described above, in the air purifier according to Aspect 2 of the present invention, if there are a plurality of utterance texts extracted by the utterance text extraction unit 11a in one category, the utterance control unit 11b may cause only an utterance text of the plurality of the utterance texts to be uttered, the utterance text being assigned the highest priority in priorities assigned in advance to the utterance texts.

According to the configuration described above, if there are the plurality of utterance texts extracted by the utterance text extraction unit 11a in one category, only the utterance text with the highest priority in priorities assigned in advance to the utterance texts is to be uttered, and thereby the user can listen to only the high priority utterance text even in the same category.

Accordingly, the user only listens to the utterance text uttered by the air purifier and thereby can know the current state of the air purifier more reliably.

In Aspect 1 or 2 described above, in the air purifier according to Aspect 3 of the present invention, the apparatus state detection unit (sensor unit 14) may detect, as the apparatus state, a detection signal from any one of various sensors (such as the dust sensor 14a, the odor sensor 14b, the light intensity sensor 14c, the temperature sensor 14d, the humidity sensor 14e, and the human sensor 14f) included in the air purifier 10.

In Aspect 1 or 2 described above, in the air purifier according to Aspect 4 of the present invention, the apparatus state detection unit (sensor unit 14) may detect, as the apparatus state, a signal (such as an operation mode or a signal from the operation panel 16) representing the operation state of the air purifier 10.

In any one of Aspects 1 to 3 described above, the air purifier according to Aspect 5 of the present invention further includes a feeling determination unit 11c that determines a feeling of the air purifier 10 that is appropriate for the apparatus state detected by the apparatus state detection unit (sensor unit 14), and the utterance control unit 11b may cause the utterance text extracted by the utterance text extraction unit 11a to be uttered with a feeling determined to be present by the feeling determination unit 11c.

According to the configuration described above, uttering the utterance text associated with the apparatus state with the feeling enables the user to know the apparatus state more easily. For example, if the air near the air purifier is impure for a long time, uttering the utterance text "In an impure state for a long time" with the feeling "anger" enables the user to realize the load on the air purifier.

In Aspect 5 described above, in the air purifier according to Aspect 6 of the present invention, the apparatus state may be numerically expressed by the detection signal from any one of the various sensors (such as the dust sensor 14a, the odor sensor 14b, the light intensity sensor 14c, the temperature sensor 14d, the humidity sensor 14e, and the human sensor 14f) included in the air purifier 10.

In Aspect 5 described above, in the air purifier according to Aspect 7 of the present invention, the apparatus state may be numerically expressed by the signal (such as the signal from the operation panel 16) representing the operation state of the air purifier.

The utterance function of the air purifier according to each aspect of the present invention may be implemented by a computer. In this case, an utterance control program for the air purifier to cause the computer to implement the utterance function of the air purifier by causing the computer to operate as components (software elements) of the utterance function of the air purifier and a computer readable recording medium storing the program are also included in the scope of the present invention.

In addition, the "air purifier" of the present invention has a broad meaning and also includes an air conditioner such as an air conditioner having an air purification function.

Further, the present invention is not limited to the embodiments described above. Various modifications may be made within the scope of claims, and an embodiment obtained by appropriately combining any ones of the technical means disclosed in the respective different embodiments is also included in the technical scope of the present invention. Further, a new technical feature can be produced by combining any ones of the technical means disclosed in the respective different embodiments.

REFERENCE SIGNS LIST 1 air-conditioning assistance system
10 air purifier
11 control unit
11a utterance text extraction unit
11b utterance control unit
11c feeling determination unit
12 memory unit
12a utterance text table
13 driving unit
14 sensor unit (apparatus state detection unit)
14a dust sensor
14b odor sensor
14c light intensity sensor
14d temperature sensor
14e humidity sensor
14f human sensor
15 communication unit
16 operation panel
17 audio output unit
20 cloud server
30 mobile terminal
40 relay station
50 user's home
60 wide area network

The invention claimed is:

1. An air purifier that has an utterance function of uttering an utterance text associated with an apparatus state indicating a state of the air purifier, the air purifier comprising:
an apparatus state detection unit that detects the apparatus state;
an utterance text extraction unit that extracts at least one utterance text associated with the apparatus state detected by the apparatus state detection unit, the apparatus state being classified as one of a plurality of types of categories, the at least one utterance text being extracted from utterance texts included in the plurality of types of categories; and
an utterance control unit that causes the at least one utterance text extracted by the utterance text extraction unit to be uttered in descending order of priorities assigned to the plurality of types of categories according to one of the priorities that is assigned to one of the plurality of types of categories that includes the at least one utterance text.

2. The air purifier according to claim 1,
wherein if there are a plurality of the utterance texts extracted by the utterance text extraction unit in one category, the utterance control unit causes only an utterance text of the plurality of the utterance texts to be uttered, the utterance text being assigned a highest priority in priorities assigned in advance to the utterance texts.

3. The purifier according to claim 1 or 2,
wherein the apparatus state detection unit detects, as the apparatus state, a detection signal from any one of various sensors included in the air purifier.

4. The air purifier according to claim 1 or 2,
wherein the apparatus state detection unit detects, as the apparatus state, a signal representing an operation state of the air purifier.

5. The air purifier according to claims 1-4, further comprising:
a feeling determination unit that determines a feeling of the air purifier, the feeling being appropriate for the apparatus state detected by the apparatus state detection unit,
wherein the utterance control unit causes the utterance text extracted by the utterance text extraction unit to be uttered with the feeling determined by the feeling determination unit.

6. The air purifier according to claim 5,
wherein the apparatus state is numerically expressed by the detection signal from any one of the various sensors included in the air purifier.

7. The air purifier according to claim 5,
wherein the apparatus state is numerically expressed by the signal representing the operation state of the air purifier.

* * * * *